United States Patent
Walsh et al.

(10) Patent No.: US 6,975,470 B2
(45) Date of Patent: Dec. 13, 2005

(54) DATA READERS

(75) Inventors: Peter Walsh, Burnham-On-Sea (GB); Rafel Jibry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 247 days.

(21) Appl. No.: 09/984,619

(22) Filed: Oct. 30, 2001

(65) Prior Publication Data

US 2002/0051308 A1   May 2, 2002

(30) Foreign Application Priority Data

Oct. 31, 2000   (GB) .................................... 0026622

(51) Int. Cl.⁷ ............................................... G11B 5/09
(52) U.S. Cl. ....................................................... 360/46
(58) Field of Search ............................ 360/46, 51, 53, 360/48, 75, 31

(56) References Cited

U.S. PATENT DOCUMENTS

| | | | |
|---|---|---|---|
| 5,047,873 A * | 9/1991 | Ballinger et al. ............. 360/22 |
| 5,247,401 A | 9/1993 | Umemoto et al. |
| 5,270,875 A | 12/1993 | Shah et al. |
| 5,553,041 A * | 9/1996 | Inagawa et al. ............... 360/51 |
| 5,663,845 A * | 9/1997 | Yamamoto et al. ...... 360/73.11 |
| 5,737,141 A * | 4/1998 | Hardwick et al. ............ 360/45 |
| 5,764,428 A | 6/1998 | Soda |

FOREIGN PATENT DOCUMENTS

| | | |
|---|---|---|
| EP | 1 300 844 | 4/2003 |
| GB | 2 369 021 A | 5/2002 |

OTHER PUBLICATIONS

PAJ abstract of JP 090063008 A (Fuji Photo Film).
PAJ abstract of JP 040095268 a (Matsushita).
PAJ abstract of JP 010298579 A (Mitsubishi).
PAJ abstract of JP 590045674 A (Pioneer).

* cited by examiner

*Primary Examiner*—David Hudspeth
*Assistant Examiner*—Glenda P. Rdriguez

(57) ABSTRACT

A data reader derives a signal on reading a data holding medium. The data reader has processing circuitry to process the signal. The processing circuitry includes a filter having a variable cut-off frequency, a velocity signal generator that produces a signal corresponding to the velocity of the data holding medium, and a processor. The reads the velocity signal and sets the filter cut-off frequency. Calibration data derived during a calibration operation of only the particular data reader determines the filter cut-off frequency for different speeds of the medium during normal read operations of the medium.

7 Claims, 3 Drawing Sheets

DATA READERS

FIELD OF THE INVENTION

This invention relates to an improved data reader and an improved method of reading data. It is particularly applicable to data storage devices, but may have wider applicability.

BACKGROUND ART

Early magnetic tape storage devices moved the magnetic tape past read heads at a fixed velocity. A low pass filter is provided within the decoding circuitry that removes unwanted high frequency noise. Because the tape passes the read head at a fixed velocity a signal produced by reading data read from the tape has a knowing maximum frequency. Therefore, the cut off frequency of the low pass filter can be set to ensure all of the signal passes the filter.

It is now known to produce magnetic tape storage devices in which the velocity of the tape past the read bead is varied. Varying the velocity in this manner helps to ensure that the rate of data transfer to and from the tape can match the rate of data transfer to the storage device. This matching of data rates helps to prevent unnecessary stopping of the storage device. Stopping causes wear to the drive mechanisms and therefore, wear can be reduced if the drive can be slowed rather than stopped.

However, by altering the velocity at which the tape passes the read head, the frequency of the signal produced on reading data from the tape is altered. Therefore, it is desirable that the cut-off frequency of the low pass filter is altered accordingly. It is undesirable to have the cut-off frequency set too far above the maximum frequency of the signal since noise will not be effectively removed. Further, if the cut-off frequency is set too low then a portion of the signal will be lost. Generally, as the tape speed increases, data rate increases and it is necessary to increase the level of the cut-off frequency in order that the higher frequency data are not filtered or attenuated.

Prior solutions to this problem are known and an example is shown in FIG. 1. In this example a Phase Locked Loop (PLL) is used to lock onto the clock derived from the tape velocity. Control currents used in the PLL to adjust internal analogue parameters such that the PLL locks to the clock frequency are also fed to the filter. These control currents cause the cut off frequency of the low pass filter to be set at the correct position for the particular clock frequency.

SUMMARY OF THE INVENTION

This technique relies on the matching of components in the PLL and the filter. This can be difficult to achieve over fabrication process corners and for the whole frequency range. These difficulties call result in a poor yield in the fabrication process.

It is an object of the present invention to provide a data storage device that is easier to fabricate than the prior art.

According to a first aspect of the invention there is provided a data reader arranged to produce a signal on reading a data holding medium, said data reader comprising processing circuitry arranged to process said signal, said processing circuitry including a filter having a variable cut-off frequency, a velocity signal generator arranged to produce a signal corresponding to the velocity of the data holding medium, and a processor, said processor being arranged to read the velocity signal and vary the cut-off frequency of the filter in substantially linear relation to variations in the velocity signal on the basis of data generated during a calibration process of the data reader.

An advantage of such a data reader is that it is easier to fabricate than prior art data readers.

Preferably, the filter is a low pass filter.

The velocity signal generator may be provided by a read head arranged to produce the signal on reading a data holding medium. The velocity signal is preferably a clock signal produced by the read head. Conveniently the frequency of the clock signal corresponds to the velocity of the tape past the read head. It is advantageous to have a clock signal as the velocity signal since this is readily read by the processor. Alternatively, an analogue signal may be produced, but it is likely that such an analogue signal would need digitising before being able to be read by the processor.

Preferably, the read head is arranged to read markers on the data-holding medium in order to produce the velocity signal. Such an arrangement provides a simple way of allowing the velocity signal to be generated.

The processor may be arranged to determine the frequency of the velocity signal in order to vary the cut-off frequency of the filter.

In any case, the processor may be arranged to vary the appropriate cut-off frequency of the filter by referring to a look up table, the values of which look up table may have been generated during the calibration process. Use of a look up table in this manner provides a simple, yet effective system for controlling the cut-off frequency.

Alternatively, the processor may set the cut-off frequency by applying a representation of the velocity signal to a function such as a polynomial function weighted to generate an appropriate output to control the cut-off frequency of the low pass filter.

Conveniently, the processor includes an output register arranged such that the register's content controls cut-off frequency of the filter. Such an output register is convenient since it provides a simple technique to output the desired cut-off frequency.

Preferably a Digital to Analogue Converter (DAC) is provided within the processing circuitry, arranged to produce an analogue signal to control the cut-off frequency of the filter.

Preferably, the DAC is arranged to have input thereto the value that is contained in the output register of the processor. Such an arrangement provides a convenient structure for controlling the filter.

The processor may be arranged to perform a self-test routine in which the values that are contained in the look up table are adjusted. Such an arrangement is convenient because it allows minor discrepancies in the values that are contained in the look up table to be corrected. Therefore, the control of the cut-off frequency of the filter should be more accurate The filter may be arranged to have an increased gain in the region of the cut-off. This is advantageous because it provides the necessary equalisation to achieve the desired signal characteristics.

Preferably, the reader is arranged to cause the velocity of the data-holding medium to be varied over any velocity within a predetermined range. In one embodiment the maximum velocity is limited to roughly three times the minimum velocity. Other ratios of maximum to minimum are equally possible: For instance roughly any of the following may be suitable: 2 to 1, 4 to 1, 5 to 1, 6 to 1, 8 to 1, or 10 to 1, or indeed any value inbetween these ranges.

In the preferred embodiment the maximum tape velocity is roughly 4.1 m/s. However, the maximum tape velocity may be roughly any of the following values: 1 m/s, 2 m/s, 3 m/s, 5 m/s, 6 m/s, 7 m/s, 8 m/s, 9 m/s.

Alternatively, or additionally, the reader is arranged to cause the velocity of the data-holding medium to be varied over a number of predetermined velocities within a predetermined range.

According to a second aspect of the invention there is provided a data storage device including a data reader according to the first aspect of the invention.

Advantageously, the storage device is provided with a buffer arranged to receive data sent to the device (and/or buffer data sent from the device). The data reader may be arranged to cause the velocity of the data-holding medium to be varied according to the amount of data present in the buffer.

In one embodiment the data storage device is arranged to receive magnetic tapes wherein the magnetic tape provides the data-holding medium. However, the device may be arranged to read data from a hard disk wherein the disk platter is the data-holding medium. The storage device may be arranged to read data from other forms of data-holding medium.

The storage device may be any of the following types of tape drive and for example may be any of the following: DAT (Digital Audio Tape), DLT (Digital Linear Tape), DDS (Digital Data Storage), or LTO (Linear Tape Open), or any other type.

The storage device may be arranged to communicate with other devices via any form of bus. The bus may be SCSI, Firewire, USB, Fibrechannel, etc.

According to a third aspect of the invention, there is provided a method of reading data from a data-holding medium to produce an output signal, the method comprising determining the velocity of the data holding medium and varying the cut-off frequency of a filter in substantially linear relation to variations in the velocity of the data-holding medium on the basis of data generated during a calibration process of the data reader.

Conveniently, the processor consults a look up table to vary the cut-off frequency. Such a method provides a convenient way of determining the cut-off frequency.

Alternatively, other methods of determining the cut-off frequency may be utilised by the processor. For instance, the processor may apply a predetermined function to a representation of the velocity of the data-holding medium to determine the cut-off frequency.

The method may comprise performing a self calibration routine in which the processor adjusts values contained in the look up table/adjusts the predetermined function to help ensure that the cut-off frequency of the filter is correctly controlled relative to the velocity of the data holding medium. This helps to ensure that data can be accurately read from the data-holding medium.

Conveniently, the filter is arranged to provide gain to a signal fed thereto in a region of the cut-off frequency. This helps to equalise the signal to the desired signal characteristics.

Preferably, the processor utilises a clock signal generated by a read head to determine the velocity of the data-holding medium. Read heads of data storage devices generally produce such a clock signal. Therefore, utilising this signal is a convenient way of determining the velocity.

BRIEF DESCRIPTION OF THE DRAWINGS

There now follows by way of example only a detailed description of the invention with reference to the accompanying drawings of which.

DETAILED DESCRIPTION OF THE

Figure 2:
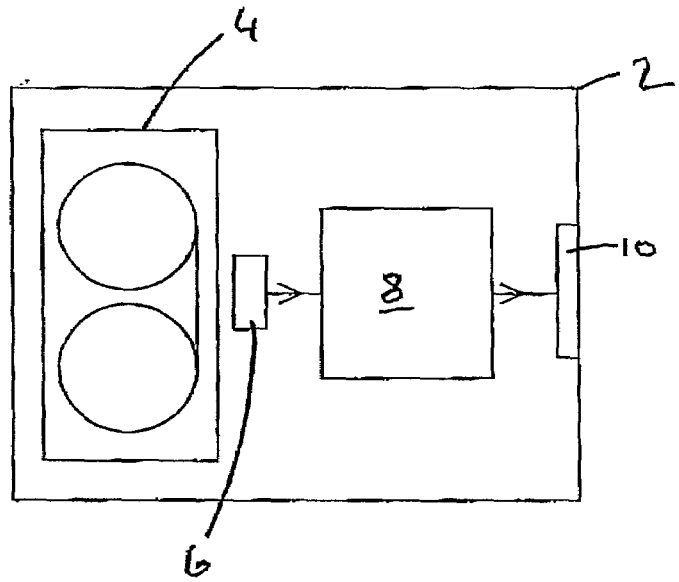
FIG. 2 is a diagram of the main components of a storage device.

The drawings are described in relation to a magnetic tape data storage device, although the principles described in connection with drawings may have wider applicability. The basic components of a magnetic tape storage device 2 are shown in FIG. 2. A data-holding medium, in this case a magnetic tape 4, is arranged to be read by a read head 6, which produces a signal that is fed to processing circuitry 8. The processing circuitry generates an output signal that is fed to an output port 10.

Figure 1:
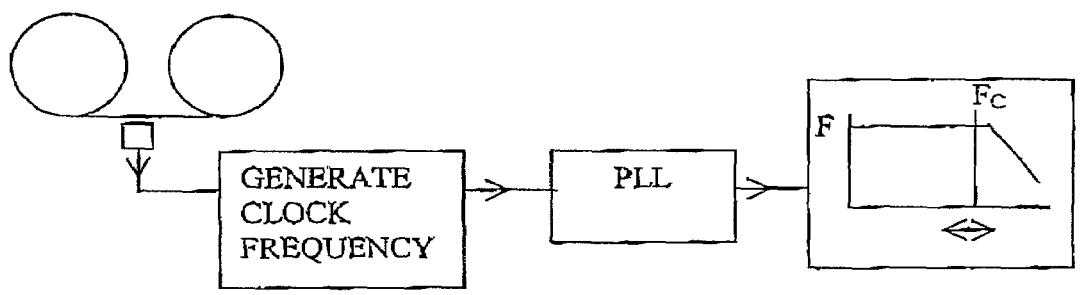
FIG. 1 is a diagram of a prior art arrangement for processing a signal read from a magnetic tape.
Figure 3:
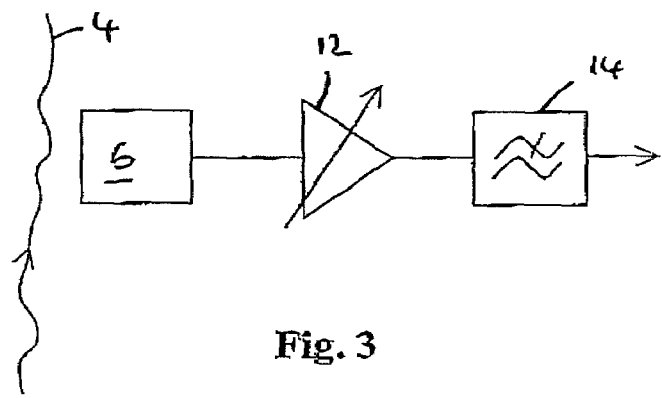
FIG. 3 is a schematic view of an arrangement for initially processing a signal produced on reading a magnetic tape.

FIG. 3 is an illustration of the read head 6 and some of the processing circuitry in more detail. The processing circuitry is arranged to pass the signal generated by the read head 2 on reading the tape 4 to a variable gain amplifier 12, which amplifies this signal. This amplified signal is fed to a low pass filter 14 arranged to remove unwanted noise above an appropriate cut-off frequency.

Figure 4:
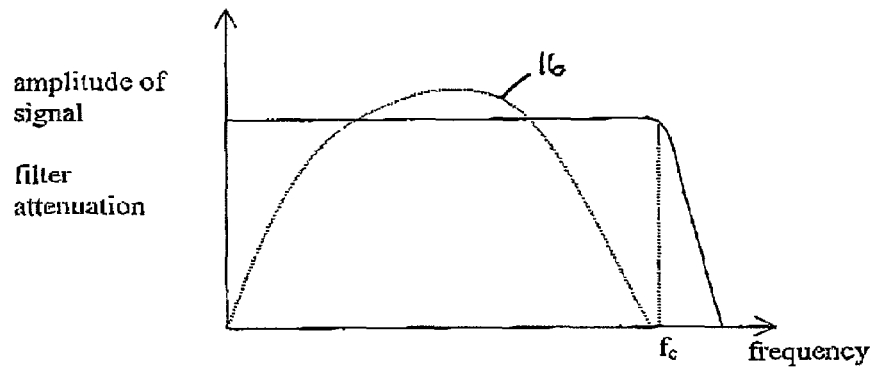
FIG. 4 includes plots of amplitude versus frequency of the frequency response of a low pass filter and the amplitude of the signal produced on reading the magnetic tape.

FIG. 4 includes exemplary plots of the relationship between the envelope 16 for the frequencies contained in the amplified signal and the attenuation of filter 14 on the signal applied to the filter. Frequency $f_c$ is the cut-off frequency of the low pass filter 14. The cut-off frequency $f_c$ should be such that all of the frequencies with the envelope 16 pass the filter without being attenuated.

However, in a tape storage device 2 in which the velocity of the tape 4 is varied to vary the data rate, the frequencies contained in the envelope 16 also vary. Therefore, to ensure that the cut-off frequency $f_c$ is not too high or too low i.e., so the filter does not let through too much noise, or remove some of the wanted frequencies respectively) the processing circuitry 8 is arranged to vary $f_c$.

Figure 5:
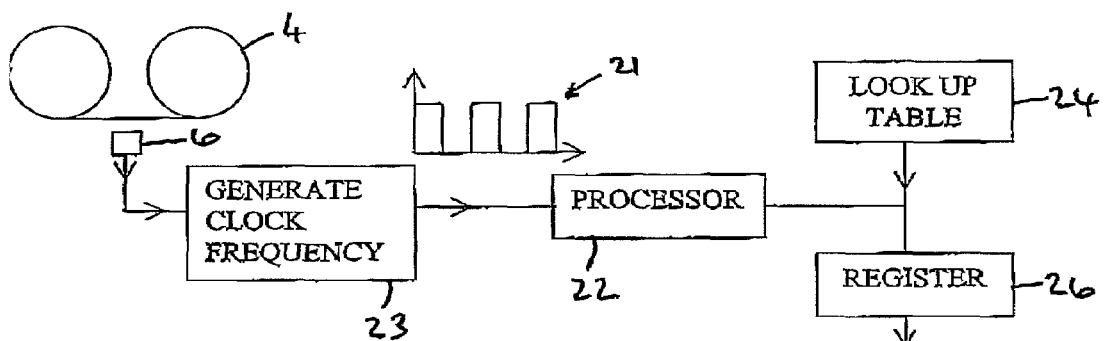
FIG. 5 is a block diagram of the components for initially processing a signal produced on reading the magnetic tape according to a preferred embodiment of present invention.
Figure 7:
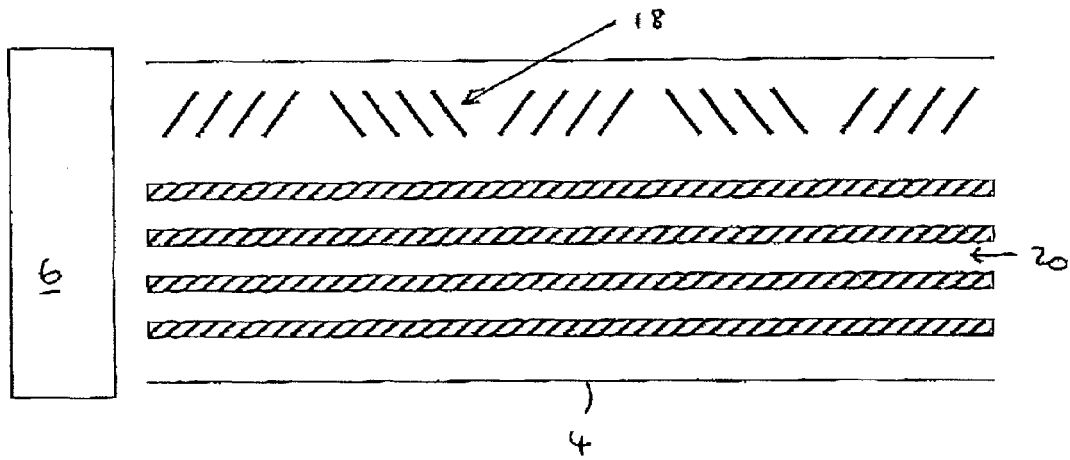
FIG. 7 is a schematic diagram of the layout of a magnetic tape capable of being read by the structure of FIG. 5.
Figure 6:
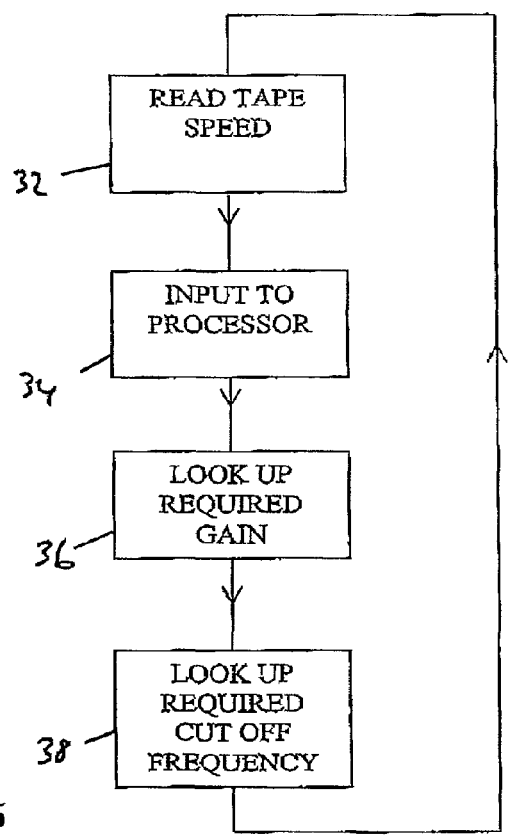
FIG. 6 is a flow chart of how the components shown in FIG. 5 are controlled.

FIG. 5 is a diagram of the blocks used to control the value of the cut-off frequency. The read head 6 produces a signal on reading the tape 4. A decoding processor 23 generates a clock frequency that is proportional to the velocity of the tape 4. As illustrated in FIG. 7, the tape 4 has a series of markings 18 in addition to the tracks of data 20. The markings 18 are read by the read head 4, which produces a clock signal 21 corresponding to the rate at which the markings pass the read head 6.

This clock signal 21 is fed to a processor 22, which determines the frequency of the clock signal 21 and consequently determines the velocity of the tape 4 passing the read head 6. Processor 22 has associated therewith a look up table 24, which contains a list of register values for various velocities of tape 4. The look up table 24 could of course be provided with memory external to the processor 22 such as E²PROM, or other non-volatile memory or possibly within dedicated memory provided within the processor 22. The values contained in the look-up table 24 are determined at the time of device manufacture and are specific to each data reader.

The processor 22 includes an output register 26, which is arranged to receive the value which, when applied to the low pass filter, causes the cutoff frequency $f_c$ of the filter 14 to be set to the appropriate value. A digital-to-analogue converter (DAC) 28 is provided and arranged to convert the digital value, placed by the processor, into the output register 26 into an analogue signal. The analogue signal 30 produced by the DAC 28 is fed to the filter 14 such that the cutoff frequency $f_c$ is varied appropriately. The analogue signal is presented as a voltage or current respectively depending on whether the filter cut-off frequency is voltage or current controlled.

Figure 8:
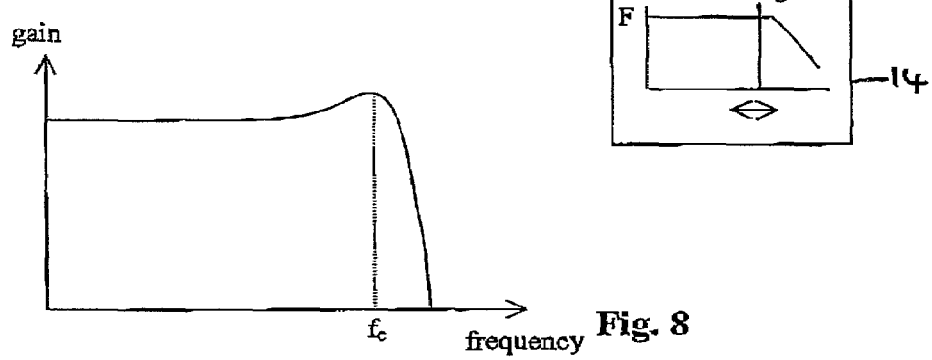
FIG. 8 is a plot of the gain versus frequency of a low pass filter.

In some embodiments the filter 14 is arranged such that there is an amount of gain in the region of the cut-off frequency $f_c$. An example of this is shown in FIG. 8.

In use, the tape 4 is inserted into the storage device 2 such that the read head 6 can read it. As the tape 4 passes the read head 6 the markings 18 on the tape are read 32 and used to produce the clock signal 21. The velocity of tape 4 is varied to alter the rate at which data is moved to/from the tape 4 to/from a device connected to the storage device 2 via the port 10.

As the velocity of the tape 4 varies the frequency of the clock signal 21 varies. Therefore, as the clock signal 21 is input to the processor 22 (block 34) the processor 22 can determine the velocity of the tape 4 by determining the frequency of the clock signal 21. Once the frequency has been determined the processor looks up in the look up table 24 (block 36) the output value to generate the required filter cut off frequency.

The output value determined by reading the look up table 24 is supplied to the output register 26, and converted to an analogue signal 30 by the DAC 28. This analogue signal 30 is input to the filter 14 to control the cut-off frequency $f_c$ (block 38).

According to the present embodiment, the relationship between the tape velocity and the cut-off frequency is substantially linear throughout the required range. The values in the look up table are set during a drive calibration process at the time of manufacture, whereby non-linearities are factored-out by setting appropriate values in the look up table. Because the calibration process maps the tape velocity to the required value of $f_c$, compensation can be made for any of these non-linearities so that velocity versus $f_c$ is linear. One example of a calibration process would be to increment the tape velocity in a linear fashion and, for each increment, vary the respective value in the look up table in order to obtain the required cutoff frequency. Other appropriate calibration procedures would be apparent to the skilled person.

If the relationship is not linear then the drop out level in data read by the reader may increase significantly (due to increased noise because the cutoff frequency is set too high, or to loss of signal because the cut-off frequency is set too low). Compensating for non-linearity allows the cutoff frequency to be set at the correct level.

The skilled person will appreciate that the term processor is envisaged to cover a range of different types of circuit: micro-controllers, microprocessors, ASIC'S, Programmable Logic Arrays (PLA), hardwired circuitry of discrete components, etc.

In alternative embodiments, the look up table can be replaced by a function for generating a processor output value, which causes the tape velocity to have a linear relationship with the cut-off frequency. In effect, the function would compensate for any intrinsic non-linearity. One function would be a polynomial of the form $a+bx+cx^2+dx^3+ \ldots +nX^m$, where x represents the tape velocity signal value and the coefficients a, b, c, d, ..., n are set at appropriate values to compensate for any non-linear relationships between the tape velocity and the resultant $f_c$. A similar calibration procedure as the one described above to calibrate the look up table could be used to calibrate the polynomial. Instead of varying the look up table values, however, calibration of the polynomial would require varying the coefficients a, b, c, d in order to arrive at the correct output.

What is claimed is:

1. An assemblage of data readers, each of the data readers including:
    (a) a transducer for deriving a signal on reading a data holding medium,
    (b) processing circuitry for processing said signal, said processing circuitry including a filter having a variable cut-off frequency,
    (c) a source for deriving a signal corresponding to the speed of the data holding medium relative to the transducer, and
    (d) a processor, said processor being arranged to read the speed signal and vary the cut-off frequency of the filter in response to the speed signal and calibration data relating the cut-off frequency of the particular data reader to the speed of the medium; the calibration data in each of the data readers being specific to that particular data reader.

2. The assemblage of claim 1 wherein the calibration data is derived prior to the readers being put in the field.

3. A data reader comprising:
    (a) a transducer for deriving a signal on reading a data holding medium,
    (b) processing circuitry for processing said signal, said processing circuitry including a filter having a variable cut-off frequency,
    (c) a source for deriving a signal corresponding to the speed of the data holding medium relative to the transducer, and
    (d) a processor, said processor being arranged to read the speed signal and vary the cut-off frequency of the filter in response to the speed signal and calibration data relating the cut-off frequency of only the particular data reader to the speed of the medium; the calibration data in the particular data reader being specific to that data reader.

4. The data reader of claim 3 wherein the calibration data is derived prior to the reader being put in the field.

5. A method of calibrating the data reader of claim 3 comprising the steps of:
    determining cut-off frequencies of the filter of the particular data reader that enable the filter of the particular data reader to have a desired output amplitude vs. frequency response for different speeds of the medium relative to the transducer of the particular data reader, and
    causing the determined cut-off frequencies for the particular data reader to be included in the calibration data only for the particular data reader.

6. The method of claim 5 wherein the calibrating method is performed before the particular data reader is put in the field.

7. The method of claim 5 wherein the calibrating method is performed individually on data readers of an assemblage of the data readers.

* * * * *